(12) United States Patent
Byrne (10) Patent No.: US 10,282,760 B2
(45) Date of Patent: May 7, 2019

(54) INCENTIVIZED AUCTION STYLE MESSAGING

(71) Applicant: Michael Collins Byrne, Cambridge, MA (US)

(72) Inventor: Michael Collins Byrne, Cambridge, MA (US)

( * ) Notice: Subject to any disclaimer, the term of this patent is extended or adjusted under 35 U.S.C. 154(b) by 0 days.

(21) Appl. No.: 14/985,387

(22) Filed: Dec. 30, 2015

(65) Prior Publication Data

US 2017/0316468 A1 Nov. 2, 2017

Related U.S. Application Data (63) Continuation of application No. 13/956,345, filed on Jul. 31, 2013, now abandoned.

(51) Int. Cl.
*G06Q 30/00* (2012.01)
*G06Q 30/02* (2012.01)

(52) U.S. Cl.
CPC ..... *G06Q 30/0277* (2013.01); *G06Q 30/0275* (2013.01)

(58) Field of Classification Search
None
See application file for complete search history.

(56) References Cited

U.S. PATENT DOCUMENTS

| | | | | |
|---|---|---|---|---|
| 5,794,210 A * | 8/1998 | Goldhaber | ......... | G06Q 30/0207 705/14.69 |
| 5,974,398 A * | 10/1999 | Hanson | ......... | G06Q 30/02 379/88.2 |
| 6,938,005 B2 * | 8/2005 | Iverson | ......... | G06Q 30/02 705/26.1 |
| 8,208,945 B2 * | 6/2012 | Ishibashi | ......... | G06Q 20/045 455/434 |
| 8,738,428 B2 * | 5/2014 | Magowan | ......... | G06Q 30/0273 705/14.1 |
| 2002/0077890 A1 * | 6/2002 | LaPointe | ......... | G06Q 30/02 705/14.28 |
| 2003/0050861 A1 * | 3/2003 | Martin | ......... | G06Q 30/08 705/26.3 |
| 2003/0078839 A1 * | 4/2003 | Kumomura | ......... | G06Q 30/02 705/14.1 |
| 2006/0041472 A1 * | 2/2006 | Lukose | ......... | G06Q 30/00 705/14.66 |
| 2006/0167753 A1 * | 7/2006 | Teague | ......... | G06Q 30/02 705/14.26 |
| 2013/0066707 A1 * | 3/2013 | Umeda | ......... | G06Q 30/0272 705/14.42 |
| 2013/0290082 A1 * | 10/2013 | Chavie | ......... | G06Q 30/0207 705/14.13 |

FOREIGN PATENT DOCUMENTS

WO  WO-2009144502 A1 * 12/2009  ............... A61B 5/16

OTHER PUBLICATIONS

IronPaper. Customer Engagement and 5 Ways to Evaluate its Effectiveness. (Sep. 22, 2013). (Year: 2013).*

* cited by examiner

*Primary Examiner* — James A Reagan
(74) *Attorney, Agent, or Firm* — Galvin Patent Law LLC; Brian R. Galvin

(57) ABSTRACT

A system for incentivization of communications, comprising an incentivization engine and an auction service, and a method for using such a system for providing incentivization of user communications and user competition for incentives.

6 Claims, 6 Drawing Sheets

INCENTIVIZED AUCTION STYLE MESSAGING

CROSS-REFERENCE TO RELATED APPLICATIONS

This application is a continuation of U.S. patent application Ser. No. 13/956,345, titled, "INCENTIVIZED AUCTION STYLE MESSAGING", which was filed on Jul. 31, 2013, the entire specification of which is incorporated herein by reference.

BACKGROUND OF THE INVENTION

Field of the Invention

The invention relates to the field of communications, and more particularly to the field of intelligent message delivery.

Discussion of the State of the Art

In the art it is common for parties to leave messages for receipt by another party that may be unavailable when a communication attempt is made. Such messages may be audio (such as voicemail), video (video-based voicemail or video calling services), or text-based (such as any of a variety of instant messaging technologies common in the art), and may additionally encompass item- or package-based messaging, such as leaving a physical or virtual parcel for another party to receive. In traditional delivery systems, a postage cost is charged to a sending party, which is collected by the courier responsible for delivery of the message or parcel. Such a method is inherently flawed, in that couriers are incentivized to "overdeliver" mail, encouraging the delivery of unwanted or "spam" messages. This tendency expresses itself in free systems as well (such as e-mail, where no fee may be charged by or to any involved party), wherein there is no deterrent measure in place to curb spam messaging, and users are forced to rely on filters that often require manual configuration or trigger "false positive" results, preventing the receipt of meaningful messages accidentally identified as spam.

What is needed, is a means to incentivize not the courier, but the transacting parties in a messaging system, such that senders are encouraged to deliver meaningful, relevant messages and offered a way to encourage recipients to read them, and recipients are encouraged to view messages or acknowledge their receipt. In such a system, a courier may collect a nominal fee or portion of fees exchanged by messaging parties, but the core mechanics of such a system should discourage or prohibit spam messaging.

SUMMARY OF THE INVENTION

Accordingly, the inventor has conceived and reduced to practice, in a preferred embodiment of the invention, a system and methods for incentivized auction-style messaging, wherein a sending party may "bid" for a message to be read by a recipient, and recipients may be incentivized to acknowledge receipt of such messages (such as by receiving some or all of the fees paid by the sender). Additionally, such operation may be useful for a variety of physical or electronic message delivery implementations as well as optionally including physical or virtual "parcel" functionality, wherein real or virtual goods may be delivered in addition to or in place of a text, audio, or video-based message.

According to a preferred embodiment of the invention, a system for providing incentivization of user communications comprising an incentivization engine and an auction service, is disclosed. According to the embodiment, an incentivization engine may provide a variety of incentives to users based on behavior such as reading receives messages or clicking on embedded links (for example), and may handle the bundling of such incentives with communications such as messages or real or virtual goods delivery (such as providing incentives that may be claimed upon receipt of a letter or parcel, such as via an included redemption voucher or code that may only be retrieved upon opening the delivery). Additionally, an auction service may provide user competition such as for incentives to be bundles or provided to other users, such as a user competing with others for a particular incentive they may wish to be able to provide when they communicate with other users. In this manner the system may be seen to handle inclusion of incentives, competition regarding the nature of such incentives, and redemption or provision of the incentives when any conditions for redemption have been satisfied.

According to a further embodiment, a method for incentivization of user communications is disclosed. According to the embodiment, users may first register with an incentivization system such as to establish an account for association with communications or incentives, and such as may be used for redemption of incentives (for example, a user may associate payment or shipping information with their account such as to be used for delivery of claimed incentives). Users may then choose to configure incentive behavior or compete for incentives such as bidding on particular incentives or other such operations (such as particular configuration or communication options, or any other feature that may be offered for user competition), such as via an auction service that may provide bid-based or similar user competition over features. Users may then communicate with each other through an incentivized communication system, claiming and delivering incentives as appropriate (such as when any requirements for redemption have been met). In this manner, operation of a system may be seen to encompass various aspects of incentivization such as configuration, competition, provision and delivery of incentives, and it may be appreciated that such an arrangement may be readily adapted for use with existing communication means of various types as are common in the art (for example, text-based messaging commonly used with network-capable mobile electronic devices). In this manner, it can be appreciated that any existing or new communication method may be incentivized, and new communication means may be incentivized according to the invention as they become realized in the art.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

The inventor has conceived, and reduced to practice, a system and method for providing incentivized auction-style messaging between a plurality of parties, that may be useful for a variety of physical or electronic message delivery implementations as well as optionally including physical or virtual "parcel" functionality, wherein real or virtual goods may be delivered in addition to or in place of a text, audio, or video-based message.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Sender", as used herein, refers to any entity (which may be an individual, an organization, a virtual entity such as an automated mailing system, or any other such entity) that may initiate a conversation, originate a message or parcel, or otherwise attempt direct or indirect communication such as sending a letter or broadcasting messages to a number of recipients, each of which may or may not be previously known to the sender (such as may be seen currently in the art with reference to automated dialing systems that attempt communication with telephone numbers according to algorithms or patterns) with a plurality of receiving parties, or "recipients" as described below.

"Recipient", as used herein, refers to any entity (again which may be an individual, an organization, a virtual entity such as an automated mailing system, or any other such entity) that may receive communication from a sender, such as an individual receiving a mailed letter, a software or hardware device receiving an electronic message, or any other suitable communication endpoint. A recipient may or may not have prior knowledge of a sender, and may be capable of receiving a variety of deliverable content as described below.

"Deliverable content", also referred to as a "deliverable" or "deliverables" when referring to more than one individual deliverable item, as used herein refers to any form of communication that may be transferred from a sender to a recipient, such as text-based messages (such as traditional written letters mailed through a postal service), audio messages (such as voice messages left on a telephone answering machine), video (such as recorded advertisements being transmitted to a suitable video player or storage device), or may be a delivery of real or virtual goods such as a physical package or delivery of electronic goods such as software or virtual items. It should be appreciated that the nature of the definition is broad, and any conceivable media that may be transferred in whole or in part, either permanently or temporarily (such as for example, a license, loan, or trial) between a plurality of parties, may be considered a "deliverable" according to the invention. It is the inventor's intent that such a broad definition be used to illustrate the broad scope of the invention, such that the system and method described herein in their preferred embodiments may be readily utilized for a variety of deliverable types and in a variety of scenarios such as to maximize utility, and it should be appreciated that any of a variety of deliverable goods may be suitable according to the invention and that alternate or additional embodiments may be utilized as appropriate according to a particular need or use case, and that the invention as disclosed may be considered to be "future proof" in that any new deliverables or means of delivery that may become available may readily be utilized according to the invention.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
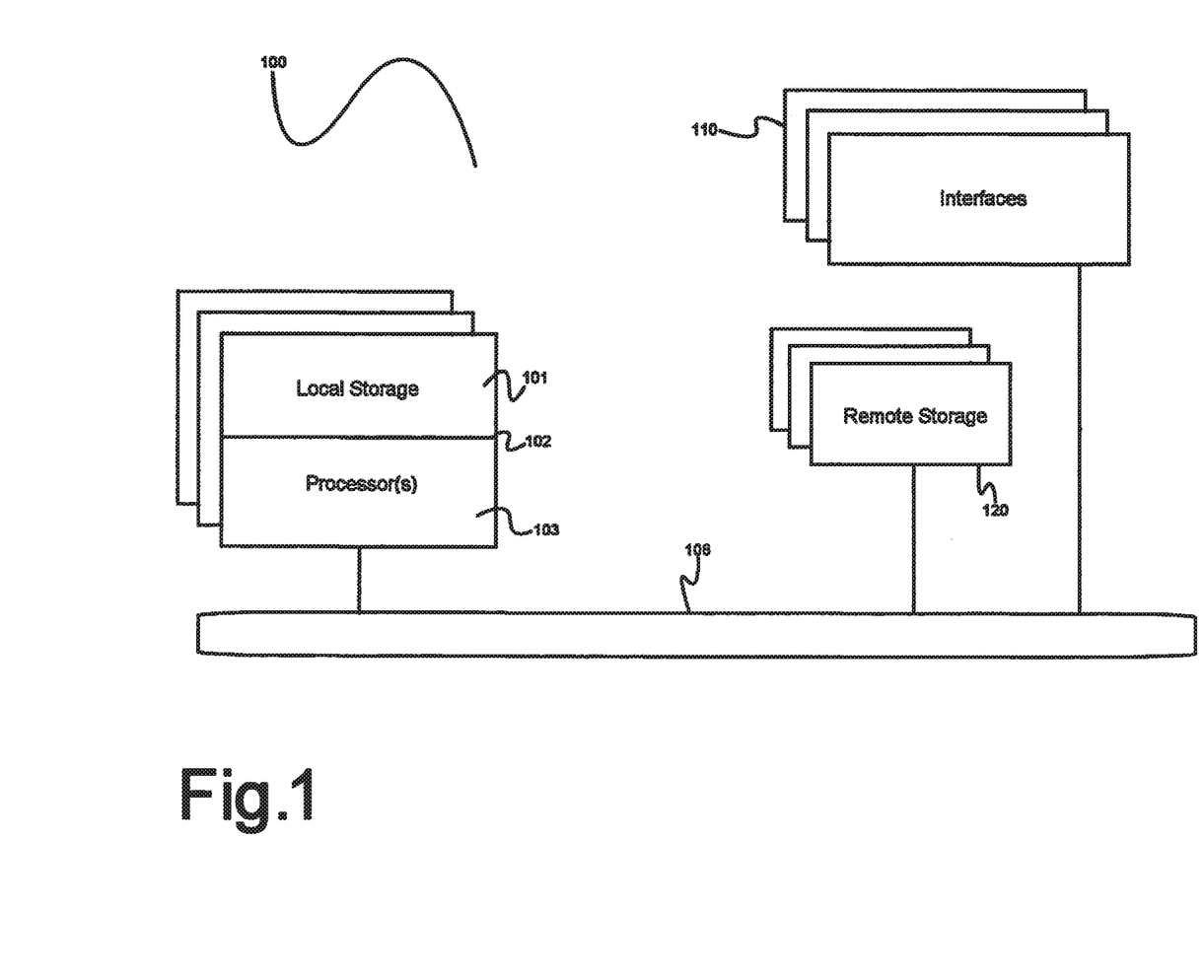
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
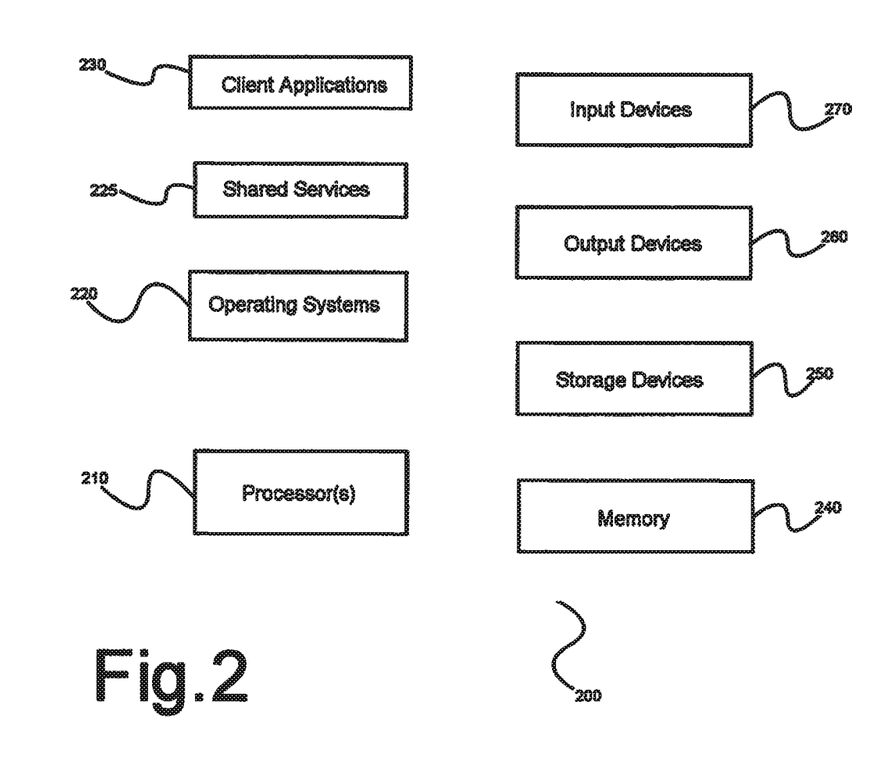
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
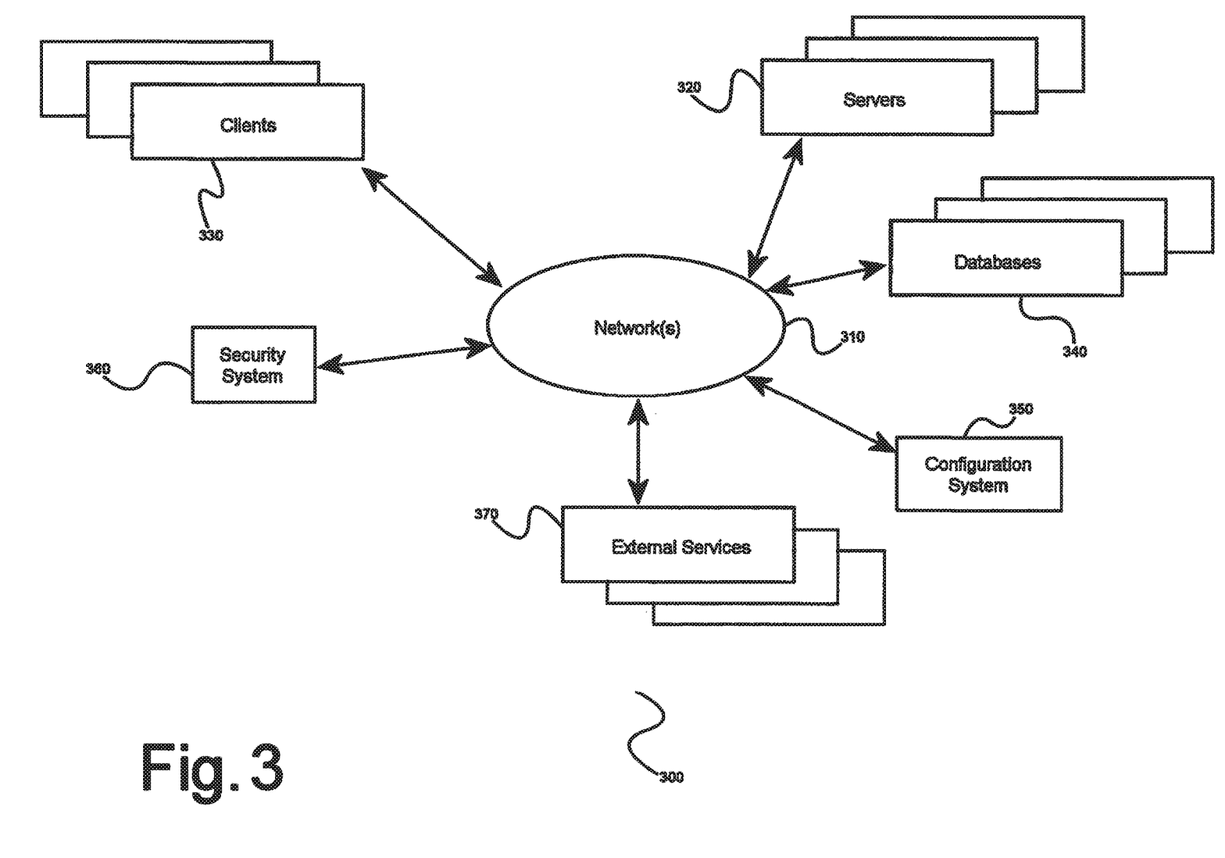
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
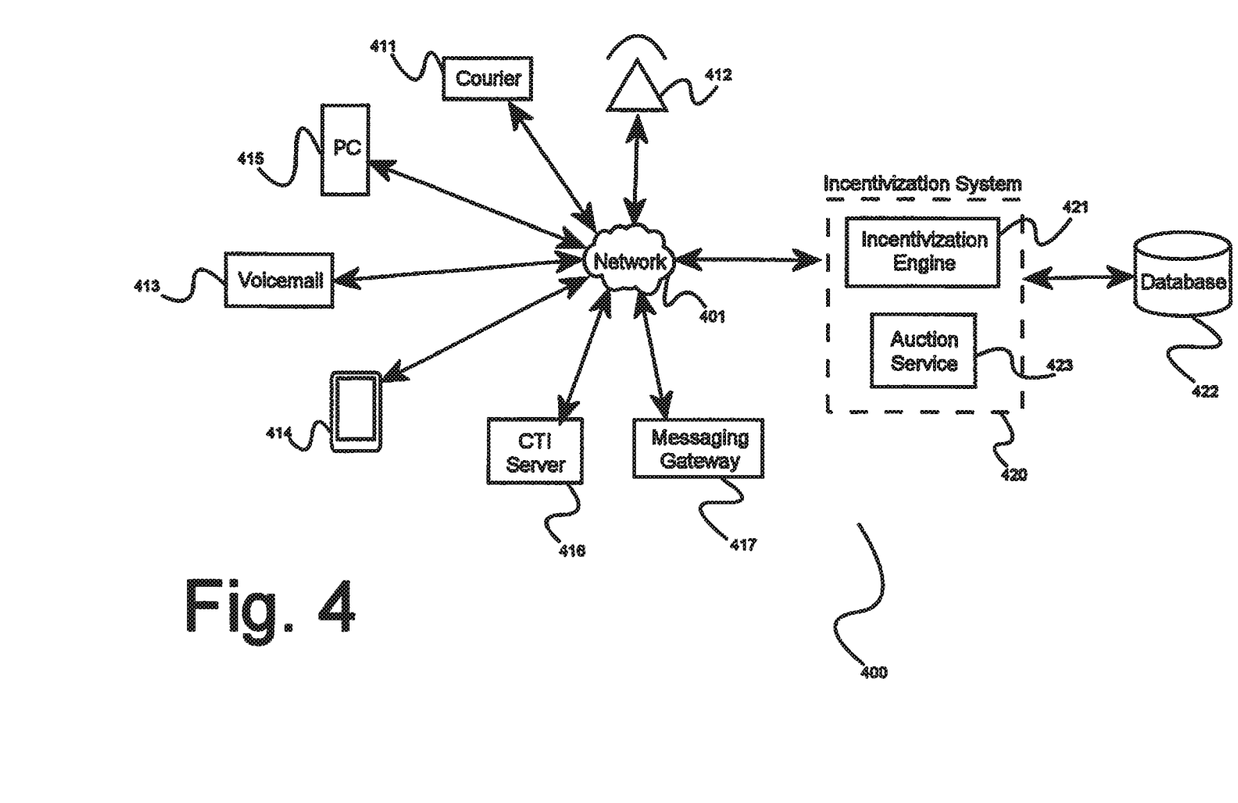
FIG. 4 is a block diagram of an exemplary system architecture for enabling incentivized communication, according to a preferred embodiment of the invention.

FIG. 4 is a block diagram illustrating an exemplary system 400 for providing incentivized messaging functionality between a plurality of parties. It should be appreciated that while specific types of deliverable or means of delivery may be described, such descriptions are exemplary and the nature of system 400 may be readily suited for use with any additional or alternate forms of deliverable or means of delivery between parties. It should be further appreciated that additional or alternate components may be utilized according to the invention, and that as such system 400 may be readily utilized with existing delivery systems or external products or services to enhance utility (either of system 400 or of existing systems that system 400 may be integrated with or operated upon).

As illustrated, a plurality of system components may be in communication via the Internet 401 or other communications network, such as for communication between components of system 400 or communication with external components or entities. It should be appreciated that any suitable communication network may be utilized according to the invention, and that various networks may be suitable for particular uses or arrangement of system 400 (such as utilizing a cellular network for delivery of cellular voice or text messages, or a postal system for delivery of physical messages or parcels). In addition, it should be appreciated that a "network" according to the invention and as defined previously may be of an "ad hoc" nature, that is a communication connection between a plurality of parties that may be either physical, electronic, or logical, and may be created and destroyed as needed with no infrastructure required. Examples of such behavior might include handheld radio-capable devices engaged in direct push-to-talk communication, or peer-to-peer text-based chat software that may operate without need for any particular network or server infrastructure, or a hand-delivered parcel being physical transported by one party to another without the use of an existing postal service or other third-party courier. In this manner it can be appreciated that the nature of the invention may be applicable to any form of communication between parties, and that particular communication methods or mechanisms may be described by way of example only, and should not be construed as limiting of the invention in any way.

As illustrated, a plurality of parties 410 may be connected through a communication network 401, such as to interact with one another or with other elements of system 400. Such parties may be of varied nature, and several examples are illustrated and described below, along with exemplary use cases.

A postal courier 411 may operate according to the invention for the receipt, transportation, or delivery of physical correspondence such as written or printed letters, documents, parcels, or other physical goods. According to such a use case, communication network 401 might comprise a postal service further comprising transportation, organization, location-mapping or other such services or features to facilitate physical transmission of deliverables as needed.

A telephone 412 or similar telephony-capable communications device may be utilized, and in such an arrangement communications network 401 might comprise a traditional "land line" or similar physical telephony connection between parties. In such cases, recording devices or software elements may be utilized such as a voicemail 413, that may be capable of recording messages from various connected devices such as a telephone 412 as needed. Such function may be desirable, for example, when a sender attempts to communicate with a recipient that is unavailable, and may desire to leave a message to be received at a later time. Alternate telephony technologies may also be utilized according to the invention, such as a cellular phone 414 operating on a mobile communications network (such as any cellular network common in the art), and which may be capable of communication using various means such as text, audio, or video interchangeably as appropriate. In this manner, it can be appreciated that various communication devices and technologies may be utilized according to the invention interchangeably, and the nature of system 400 may be readily adaptable to utilize any new devices or technologies that may become available in the art.

A personal computing device such as a desktop 415 or other personal computer may be utilized, such as a laptop or tablet computing device, and such devices may be capable of communicating over a plurality of networks 401 interchangeably or simultaneously, according to the nature of any particular device (for example, many mobile computing devices common in the art are capable of communication over both wi-fi and cellular radio networks and may do so simultaneously depending on their particular hardware configuration). In this manner, devices may communicate over a plurality of networks 401 concurrently, such as to communicate with multiple recipients or elements of system 400 that may individually communicate on, be connected to, or otherwise utilize different network technologies. Additionally, as further illustrated a variety of hardware or software bridges may be utilized according to the invention such as to connect different communication networks or technologies for compatibility, such as (for example) a CTI server 416 that may connect or facilitate interaction between the Internet with telephony networks, or an SMS gateway 417 that may connect or facilitate interaction between cellular communication networks and internet-based communication such as e-mails or instant messages sent via Internet-enabled hardware or software such as traditionally may be used for Internet communication (i.e., communication between two Internet-connected devices such as may be appropriate when other forms of communication may be unavailable or undesirable). In this manner it can be appreciated that system 400 is flexible and a variety of devices and technologies may be utilized and may be capable of interconnectivity even across multiple different or otherwise incompatible communication technologies according to the invention, and that in doing so the scope of the invention may be seen to broadly encompass any form of communication or interaction between parties regardless of the nature of devices, technologies, or communication means employed in order to facilitate such communication or interaction.

According to the embodiment, an incentivization system 420 may be connected to a plurality of communication networks 401 and may comprise a plurality of components as described below, such as to provide and operate incentive-based functionality for communication between parties. Such incentivization may vary according to the nature of any particular arrangement and according to the nature of communication, devices, or other factors in party interactions. In this manner, it can be appreciated that various forms of incentivization may be provided as appropriate, such as offering monetary incentives for parties engaged in electronic communication, or physical coupons for parties communicating via physical means (such as via a postal system). The manner in which incentives may be delivered to a party may similarly vary, and it should be appreciated that as illustrated an incentivization system 420 need not be directly connected to any particular device or communication service, and that in this manner operation may be provided to any appropriate communication means such as directly attaching or embedding incentive information to electronic communications, or integrating with external elements such as a software API 430 of a communications courier to provide information for incentivization that may then be utilized by a courier (such as software utilized by a courier service to interact with an incentivization system 420, that may notify a courier about incentives that they may then provide directly to a recipient party upon delivery).

As illustrated according to the embodiment, a hardware or software-based incentivization engine 421 may be utilized such as to determine appropriate incentives or rewards to be offered to interacting parties, or to facilitate the provision of such incentives as may be appropriate. As illustrated, engine 421 may be connected to or communicate via the Internet 401 or other communication networks, and need not be directly connected to any particular device in order to facilitate function (although such an arrangement may also be utilized according to the invention, as described below). It should be appreciated that while only a single incentivization engine 421 is shown for illustrative purposes, additional or alternate engines may be utilized according to the invention such as to connect engines to multiple communication networks, or to connect directly to devices as may be desirable according to a particular arrangement (such as using a software-based incentivization engine as a component of a software application installed on a mobile smartphone, for example).

It can be appreciated by one having skill in the art, that incentivization engine 421 may be utilized to operate further on communications according to the invention, such as due to its functional nature of attaching or embedding information (such as incentive details) with such communications. In this manner, additional information or "metadata" may be attached to or embedded within communications, and may be used for a variety of incentive- and non-incentive-based purposes, such as for message tracking or organization (such as automatically filtering messages into different "inboxes" as are common in e-mail and other text-based communication means common in the art, or embedding product or purchase metadata into an automated message such as a receipt when an electronic purchase is made, that might be used to sort purchase receipts or promote them above other messages in a message queue so they may be reviewed more quickly by a user), display configuration such as the inclusion of graphics or layout information, inclusion of relevant additional actions such as selectable options that a recipient may be required to interact with prior to returning or responding to a message (such as organizational tags or categories, that may for example be configured by a message sender to tailor the information conveyed in a response from a recipient), inclusion of contact details such as to facilitate communication with unknown parties (such as may be useful in an advertising context, where a recipient may be previously unaware of a sending party's information), blacklisting or whitelisting (i.e., the practice of automatically accepting or declining messages based on such information as sender identity or embedded metadata, allowing a recipient to tailor their contact preferences), or any other purpose as may be appropriate according to the nature of communication. Such metadata may be configurable by sending parties such as selecting information or options to be included with communications at the time of generating or sending such communications, or may optionally be pre-configured such as reading stored metadata settings from previous communications, or using default or template-based settings such as may be useful in a service-based context (Such as a service provider operating a system 400 for incentivization, providing preset templates for metadata). Such configuration information may be stored in and accessible from a database 422, such as a described below, or any other relevant data storage technology as are common in the art (such as built-in storage means on a user's device).

In this manner, the core functionality provided by an incentivization engine 421 (i.e., that of attaching information to communications as they are created or processed) may be seen to be useful not only for directly providing incentives to relevant parties, but also for expanding the utility or relevancy of any communications by allowing the inclusion of additional information or functionality as may be appropriate. Additionally, such functionality may be utilized in additional contexts such as for sending communications to non-human entities (such as software- or hardware-based devices or systems, i.e. sending text messages to a messaging-capable security system such as for remote interaction or monitoring, as is common in the art), effectively enabling communication with the "Internet of things" (as it is known in the art). In this manner, metadata may be utilized to provide information or operate functions appropriate to such a use, such as (for example) attaching location-based information to communications with an automated answering system for an establishment, retrieving a web address or other information relevant to an interacted object (such as a user identifying a product via a mobile device such as a smartphone, and then being directed to an information or contact page for the product or manufacturer, or automatically generating a pre-configured contact message that may optionally allow for further interaction to customize before sending), or a "friend/follow" function such as is common in social media contexts in the art, enabling users to choose to be notified of changes or updates, or subscribe for further communications regarding an item. Such function may additionally be utilized in a geographic context, such as selecting geographic areas to enable fee-free messaging within certain configurable or pre-set parameters (such as "allow messages between these hours"), or using a "friend/follow" functionality to create a geographical group such as a neighborhood or similar location-based association. By combining with other functions as described, a user might (for example) configure a neighborhood group that is allowed to message them for free within specified time parameters, or up to a certain message limit (as may be desirable to prevent unwanted bulk messages or "spam"). Authorities might (for example) utilize such functions for the broadcast or distribution of notices such as emergency alerts (such as flood warnings or amber alerts) or non-emergency informational notices (such as traffic updates, construction information, utility outages, or other information that may be desirable to broadcast to a general or specific population). Purchasers of a product may choose to "friend/follow" that product for future notices such as regarding product updates, recalls, discounts, or any other relevant information pertaining to a purchased product or service.

A further function that may be utilized according to the invention may be that of time-based messaging (i.e., post- or future-dated messaging functionality). In this manner, a user may choose to send a preconfigured message at a given time, or send a message with a prior timestamp as may be desirable to manually manipulate sorting of messages (for example, sending a message specifically dated to appear at a lower position in a message queue, or to appear at a specific position relative to other messages). It should be appreciated that such metadata and other functions for use with an "Internet of things" may be configured and provided by a system 400, rather than requiring specific alterations or adaptation of existing items, objects, systems, or services. In this manner, such existing components may be added to such functionality easily and at low or no cost to their respective owners or operators. Additionally, such implementation may allow a greater degree of flexibility with regard to the nature of items utilized—for example, functionality may be added to business cards (or other forms of business information such as registry entries, contact or identity information such as names or logos appearing in advertisements, or any other available means of identifying a brand or entity), product identifiers such as ISBN or UPC information or content such as text from within a book or an image of a product, vehicle identifiers such as VIN numbers or license plates, individual contact information such as ID cards (driver's license, passport, library card, social security card, or any other form of suitable personal identification), internet information such as web addresses or domain names, or any other such recognizable form of identification that may be linked to a general (such as identifying a model of car) or specific (such as identifying a particular vehicle of that model) item. A further use of such integrated function with real-world items, may be the implementation of a "lost and found" system. A user may generate an identifier (such as a barcode or QR code) to associate with an item, such as a purchased product (for example, a personal computer). In the event another user interacts with the item (such as scanning an affixed barcode), the owner's information may be populated in a message such as to enable notification ("Hello, I found your stolen laptop"), and it may be appreciated that inclusion of further metadata functionality as described previously may also be desirable ("I found it at location X at time Y, and my info is Z"). Additionally, an owner's information may not be made viewable to a user, but may be included in a message in a non-viewable or encrypted form to protect privacy (as described below), allowing individuals to be contacted regarding lost or stolen goods without exposing personal information (such as to prevent a thief scanning an item they stole from acquiring further information).

It will be appreciated that some privacy concerns may arise, for example it may not be desirable to potentially have personally-identifiable information such as contact information or license plate numbers (as described above) available on a messaging device. Accordingly, an incentivization engine 421 may encode such data to prevent unwanted access, such as by utilizing any of a variety of encryption or hashing means common in the art. It may also be seen that such functions may be available from external or third-party services or products, such as (for example) if a system 400 is accessed via a mobile application on a user's device such as a smartphone. In such an arrangement, a mobile application or other service may provide a privacy layer such as hashing all information content, while a system 400 handles the various operations and functions described herein. In this manner, it can be seen that specific privacy functionality may be tailored according to a particular arrangement, and also that a certain "minimum degree" privacy layer may be implemented as a function of an incentivization system 420 with the option to increase privacy or security through external or third-party additions as described previously.

In this manner, communications with such systems or entities may be enhanced by providing additional information or functions that may be relevant to such interactions and that may otherwise require additional actions on the part of a human user attempting communication. For example, a user may receive an advertisement for a restaurant that was sent from an automated messaging service; such an advertisement might include location or operation information such as operating hours, in addition to more traditional details such as a contact number for response or to make a reservation. In a traditional communication interaction, a user might be required to locate such location or operation detail on their own, perhaps with the aid of details included with a message (such as a voice recording stating an establishment's business hours), but by inclusion of such information as embedded metadata with a communication, the process may be streamlined and communication may be made more convenient and reliable for users. For example, a user may receive a message on a mobile device such as a smartphone 414, which may include location information to be used in a mapping application on their device, and may optionally (for example) include interactive functionality such as an option to "click here to view our location" that might be allowed to interact with a device's mapping application (or any other relevant feature or service) for easier interaction. It should be appreciated that potential uses and variations for such metadata and interactive functionality as described may vary widely according to the invention and as may be relevant to a particular arrangement or communication, such as (for example) allowing additional interactive features for users, such as viewing an interactive map display, or interactive information fields to return information with a message response, or any other such functionality that may be relevant or useful to communicating parties.

Such metadata functionality as described above may be further extended to allow operation of a variety of embedded communication means with any of a variety of non-network-connected devices, such as (for example) a vehicle or building (i.e., the physical vehicle or building itself, not any systems or services operating within the building, which may themselves be network-connected). For example, a specially-created identifier may be provided (such as a URL or webpage address, or a unique identifier such as a barcode or quick response (QR) code, as are common in the art), and such an identifier may enable the automated generation of a communication with appropriate metadata, such as (continuing an above example) using a network-connected device such as a smartphone 414 to scan a QR code found on a company vehicle (such as printed on the side of a vehicle or included as an embedded part of a logo or other brand identifier), that may use hardware or software features of the scanning device to populate variable metadata (such as the location at which it was scanned or any other such data that may depend on any variable conditions), fixed or non-variable metadata such as contact information for the operator of the vehicle (i.e., data that remains constant regardless of the conditions under which the identifier was scanned—a company's phone number remains the same regardless of the vehicle's physical location or state), and generate a communication (such as a service quote request) to optionally be sent with any such metadata included automatically. In this manner, an incentivization engine 421 may be used to provide a new form of interaction with parties by interacting indirectly through devices, locations, products, or any other traditionally non-interactive item, using the functionality of incentivization engine 421 to provide such communication optionally utilizing information provided by or associated with such items. In this manner, it can be appreciated that any existing items may be readily incorporated into the function of a system 400, such as by generating relevant interactive identifiers as described above, all functions of which may be stored, accessible, and facilitated by system 400 rather than requiring functional changes to the item itself—i.e., a QR code may be generated and the associated actions or information may be stored within a database 422 or similar data storage, rather than adapting an item such as a vehicle to store such information directly within itself, such that a generated QR code may then be affixed or otherwise associated with an item (such as being displayed on the side of a company vehicle), and no further changes to the item itself are required. According to a particular arrangement, it may be desirable to verify ownership of an item before allowing further action (such as, for example, to prevent someone from adding functionality to a vehicle or website they do not operate). Such verification may be accomplished in a variety of ways, such as phone verification or address-based verification (such as via mailed verification letters, as are commonly used in banking), generated codes sent to a web operator, or any other appropriate verification method as are common in the art. A further use of such verification may be for the implementation of a tier-based account system, such as might provide a "premier" or similar status to users who voluntarily verify their identity with a system 400 (as is commonly used in the art, such as with online memberships or financial institutions). Additionally, verified members may be allowed to "invite" others and provide a degree of verification by effectively "vouching" for new members via sent invitations, that may be varied in nature such as sending a generated invitation web URL via a text-based message, or any other appropriate communication method.

As further illustrated according to the embodiment, a database 422 or similar storage means may be utilized, such as for storing party-specific information to facilitate system function (such as user account info in a subscription- or service-based arrangement, or various contact information for parties to facilitate communication between them). Such data storage may vary in nature such as physical storage (such as removable or integrated magnetic or optical storage means common in the art), or software-based (such as various database software common in the art), and may be either local or remote with regard to other components of an incentivization system 420 (such as cloud-based storage common in the art). It should also be appreciated that additional or alternate storage means may be utilized according to the invention, such that a system 420 may utilize multiple storage sources as may be appropriate according to a particular arrangement (such as utilizing a local, physical storage for system information required for operation, while operating a cloud-based storage for user data).

As further illustrated, an optional auction service 423 may be utilized such as to provide such functionality as "bidding" on incentives or other such competitive behavior. In this manner competitive behavior may be provided for parties to enhance the incentivization process as well as the nature of communication, such as (for example) allowing advertisers (senders) to bid varying incentive values to be provided with advertisements that may be presented to a current or potential customer (recipient), who may then receive such incentives based on the advertisements viewed or responded to—for example, competing vendors might bid against each other based on their perceived value of the customer, to ensure their advertisement is the one that is viewed rather than a competitor's. Upon viewing, the customer may then be given the incentive and optionally be given an opportunity to view additional advertisements. In this manner it can be appreciated that not only may a bidding service 423 determine what interactions are available to a recipient (such as based on the highest bidder), but may also determine how they are presented (such as senders bidding on prioritization or additional features such as graphics embedded in an e-mail advertisement, described below). It should be appreciated that such behavior may be highly variable according to a particular arrangement and the above example is only one of many potential configuration, and that specific behaviors may vary widely according to such factors as the nature of communication (family members may not wish to bid on messages sent to each other), and furthermore that such configuration information may also be modifiable such as stored configuration in a database 422 that may be utilized in determining behavior during operation, and that may be configured by parties (such as setting behavior preferences in a software application that facilitates incentivization of electronic communications). Some examples of potential behavior are described below, referring to FIG. 5 and FIG. 6.

An exemplary use of such an auction-style functionality may be the auctioning of "upsells", or additional features to be included with selected communications. For example, senders could bid on embedded features such as audio or video content to be included with text-based messages, such as sending a text advertisement with a link to a promotional video. Such content may be optional, such as including a link to a video rather than the video itself, allowing a receiver to choose whether to view the content and claim any associated incentive (if provided). In this manner, senders may compete for message content or quality, while receivers may still exercise some control over the nature of received communications based on their own discretion. Additionally, such content could be incentivized in a rate-based, rather than fixed-price, manner. For example, rather than providing a fixed incentive to any recipient who clicks a link (encouraging link-spamming wherein users click without actually paying attention to content, defeating the purpose of the upsell while claiming the rewards) a sender may choose to provide incentives based on the time spent viewing content—encouraging recipients to view an entire video, or keep content focused on a device's screen (rather than clicking a link and then immediately switching to other tasks, such as may be done on a smartphone or similar mobile device). In this manner, recipients may still be incentivized but senders may have some assurance that their content will be digested rather than overlooked. A further utilization combining content embedding with metadata (as described previously) may be the ability to provide a "content service" wherein a sender may choose to include content such as a video clip, and request similar content in a message response. In this manner, users may be able to submit content for review, requesting responses with relevant content such as (for example) submitting a video of them performing a task such as a sporting activity, and requesting advice from message recipients (such as, according to such an example, a professional sports coach offering to provide advice). A further function may be to provide a rate-based call service, such as (continuing the previous example) for a user to pay on a per-time basis to speak with a coach for advice, in a manner similar to pay-per-minute phone numbers common in the art. Such behavior may be configurable via previously-described auction-style operation, such as bidding on a price rate or choosing to offer some or all of a call for free, as well as optionally selecting incentivized compensation for callers if a number is unavailable.

A further auction-style use may be the bidding of office hours or other contact criteria. User may be allowed to book appointments and bid on availability, with a specified "lock-in" period after which bidding is ended and the schedule becomes fixed. In this manner, for example, a presenter's schedule availability may be made known to potential attendees, and they may be allowed to bid for scheduling times at configurable rates and with configurable flexibility or lock-in periods, such that both presenter and attendees have appropriate control over their interaction.

It should be appreciated that any currencies used in auction-style operation may be real or virtual currency (such as BITCOIN™ or an internal credit-based system), or combinations thereof interchangeably. In this manner, a virtual currency may be utilized such as to facilitate transactions between users that may otherwise utilize different real-world currencies (i.e., international interactions). Conversion of virtual currency to real currency (such as allowing users to purchase "credits" or other virtual currency for use within system 400, or exchange such credits for actual currency) may be performed within an auction service 423 or may be performed externally, such as by a currency exchange service operated independently of a system 400 or provided as a third-party product or service, as are common in the art.

It should be appreciated that in the manner described and illustrated, any conceivable communication means may be enhanced by the provision of incentivization operated by components of a system 400, and that in this manner the specific nature of incentivization may be flexible and various forms or methods of incentivization may be utilized according to the invention, some examples of which are described below (referring to FIG. 5 and FIG. 6).

Detailed Description of Exemplary Embodiments

Figure 5:
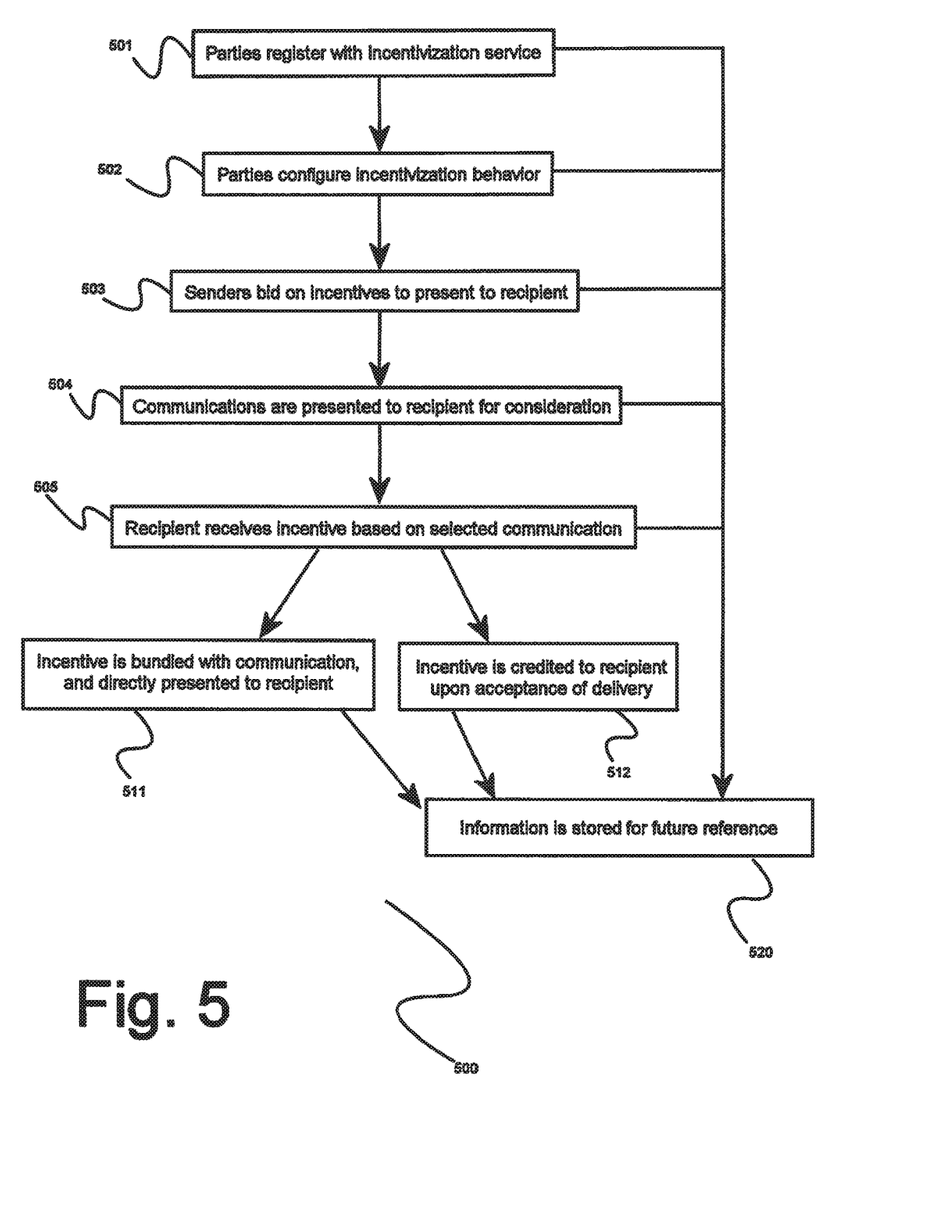
FIG. 5 is a method diagram illustrating an exemplary method for "auction-style" communication, according to an embodiment of the invention.

FIG. 5 is a method diagram illustrating an exemplary method 500 for providing incentivized communication between a plurality of parties, according to an embodiment of the invention. According to the embodiment illustrated, communication may vary such as (as illustrated) text-based electronic communication such as e-mail, audio-based communication such as voicemail, or a physical delivery such as a parcel. According to the embodiment illustrated, a service provider may operate an incentivization service to allow parties to offer, compete, configure or claim incentives associated with their interactions or communications, and it should be appreciated that such an arrangement is exemplary and additional or alternate operation may be utilized according to the invention.

In an initial step 501, parties may register with an incentivization service. Such registration may be anonymous or personalized according to the nature of communication or incentivization, such as users creating anonymous online accounts to utilize incentivization with their e-mail addresses (which may or may not necessarily have any association with a party's actual identity), or parties registering their actual name and mailing address for incentivization of postal deliveries or other physical communication. In an optional step 520 party information may be stored for future reference, such as creating a persistent user account for repeated incentivized communications. It should be appreciated that while a single storage step 520 is shown for illustrative purposes, additional or alternate steps may be utilized according to the invention such as to store or retrieve specific data (for example, storing user information but not communication preferences), and a single step is shown only by way of example and for clarity of illustration.

In a next step 502, parties may configure their incentive behavior such as configuring default incentive types or amounts when sending communications, preferred incentive types when a party is the recipient of communication, communication types for incentivization (such as selecting to incentivize all e-mail communication but not voicemail recordings), or time-based information such as an incentive "window", i.e. a timeframe during which an incentive remains valid (such as providing limited-time offers or coupons, as are common in the art). In this manner, parties may have varying amounts of control over the specific behavior of incentivization presented to them, allowing for a more personalized experience. In an optional step 520, such configuration may be stored such as in a user's persistent profile, such that a party's preferences may be available for future reference (such as verifying preferred behavior each time communication occurs to ensure consistency).

In a next step 503, parties may choose to bid on incentives or otherwise compete in an auction-style system for determining specific incentive behavior. For example, multiple vendors may wish to advertise their products or services to a potential customer that is registered with an incentivization service. If available, a recipient's configured preferences may be retrieved for configuring incentive behavior (such as not allowing vendors to compete for audio advertisements presented to a customer who has selected not to incentivize audio communications). Vendors may then compete in a variety of ways, such as bidding on a monetary incentive value to be offered to a customer for viewing or interacting with their advertisement, or offering proprietary incentives that may be relevant to a customer's interests as determined by any known preferences (such as a provider of a service offering a specific feature that a customer has stated an interest in). In this manner, relevant communications and desirable incentives may be offered to registered members, encouraging use of an incentivization system to improve the quality of communications received and help mitigate the problem of unwanted or "spam" communications. Additionally, in an optional step 520 auction information may be stored such as to improve future behavior—for example, an incentivization service provider may store auction results to determine a "value" for recipient parties, that may be used such as to determine future auction behavior (such as minimum bid amounts) or to present to senders for consideration when making a communication attempt (such as allowing senders to view recent auction results while deciding whether to attempt communication).

In a next step 504, a recipient may view available communications for consideration. They might be presented with only the highest-bid communication, or presented with multiple communications to select from (optionally in a hierarchical order or similar organization based on auction results from a previous step), and they may be given an opportunity to select which communications (if any) they wish to receive. This may be appreciated to be similar to a mailbox, wherein a recipient may view available communications with some basic information (who is it from, what did they pay to send it, any additional information that was made available) prior to deciding whether or not to "open" it and view the communication in full. Such behavior may also enable "upsell" functionality (As was briefly described previously, referring to FIG. 4), wherein senders may choose to offer additional incentives to add features to a communication, such as specialized presentation or handling, or additional information to be presented to a user regardless of whether they accept the communication or not (similar to a sender affixing marketing material to the outside of a mailed letter in the hopes of encouraging a recipient to open it). In an optional step 520, information about a recipient's behavior may be stored for future use, such as determining what communications a particular recipient is most likely to respond to.

In a next step 505, a user may receive incentives based on the nature of communication they selected for viewing or acceptance. Two alternate means of delivering incentives are illustrated, and it should be appreciated that additional or alternate delivery behavior may be utilized according to the invention, and that incentive and delivery nature may vary according to the invention and as may be appropriate according to the nature of the recipient, communication, or arrangement of a particular incentivization system.

In a next step 511, incentives may be bundles directly with a communication and a recipient may receive them immediately upon delivery. For example, a physical parcel might be packaged with a small "bonus item" as an incentive, such that the incentive is immediately presented to the recipient upon opening the package. Such a method may also be utilized with electronic communication or virtual deliverable goods, such as sending an e-mail with an embedded link that, when clicked, may provide various incentives such as downloadable software or information, viewable media content, or crediting a recipient with electronic currency such as BITCOIN™ or PAYPAL™. In this manner, an incentive may be provided to an anonymous recipient without requiring knowledge of their information for delivery.

In an alternate step 512, incentives may be credited to a recipient such as by crediting their account with an incentivization service provider, or other account that may have been previously configured for acceptance of incentives (such as a PAYPAL™ account optionally setup for preferred delivery of incentives in a previous step 502). In this manner a recipient may be allowed some control over the types of incentives they may be offered, as well as a unified means of delivery. In a last optional step 520, incentive and communication information may be stored for future use such as in determining behavior patterns of recipients to optimize operation.

It should be appreciated that various aspects of operation and behavior may be configured by users (both sender and recipient), to customize behavior. For example, a recipient may configure select known accounts to be allowed to send messages without the need for incentivization (such as for friends and family members), allowing them to simply communicate as normal without the incentivization "overlay" provided. Configuration may be broad (these users may communicate for free), or very specific (this particular sender may communicate for free for one month, using only this communication method and during these time windows), according to the desired operation and arrangement of an incentivization system 400 being utilized. In this manner, an incentivization system may be accessible to a wide audience of users regardless of technical ability or desire to spend time configuring details, allowing enhanced communication without inconvenience while still offering the added functionality of user-tailored operation.

Figure 6:
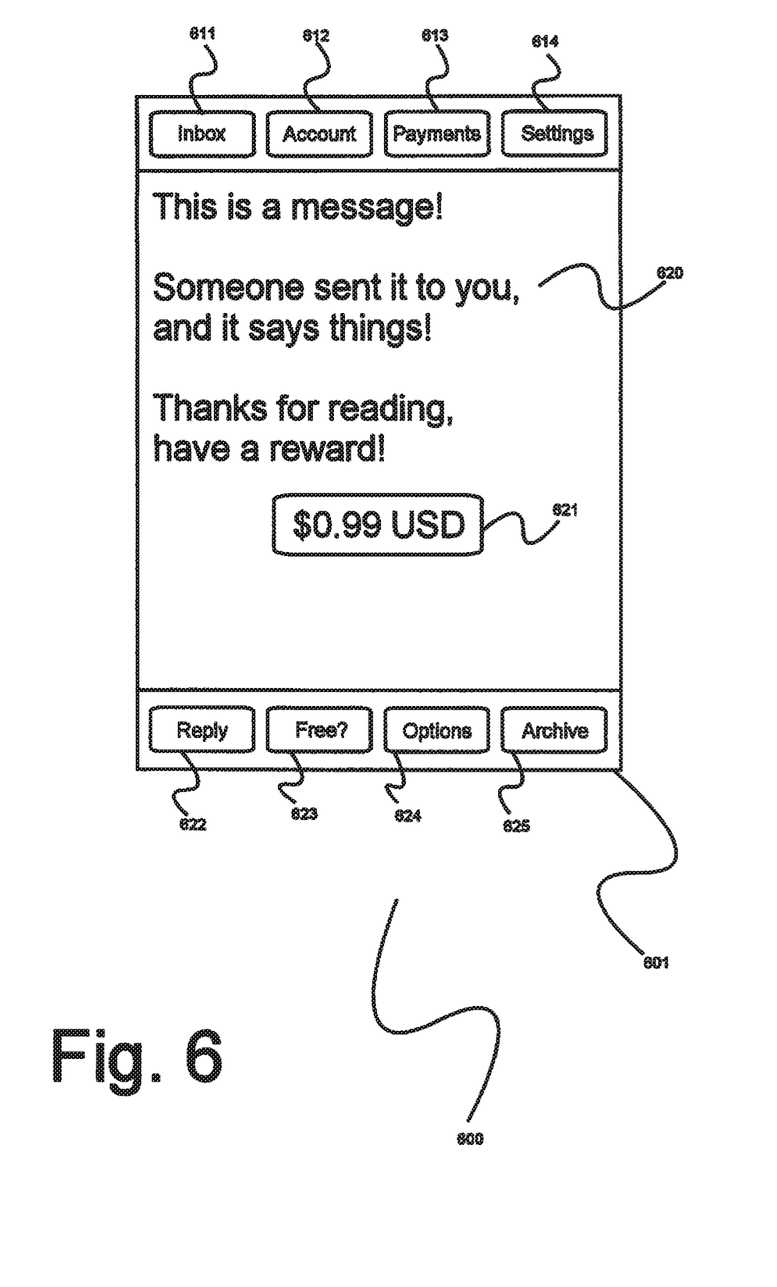
FIG. 6 is an illustration of an exemplary user interface for a mobile software application enabling incentivized communication, according to an embodiment of the invention.

FIG. 6 is an illustration of an exemplary graphical interface 600 for an exemplary mobile software application according to an embodiment of the invention. Such an application may enable a user to interact with an incentivization service such as for configuring their preferences or account information (as described above referring to FIG. 5), or for sending and receipt of communications within the application itself. It should be appreciated that while a dedicated software app is being illustrated, additional or alternate means of communication may be utilized according to the invention, and furthermore that the operation of an incentivization system according to the invention may be integrated with existent communication means such as adding incentivization functionality to a mobile device's present phone or text messaging software apps, rather than requiring a user to install or utilize a dedicated app.

As illustrated, an app 600 may present a user with a primary display window 601 that may display communication information such as text-based message content or audio or video player controls or interfaces (which may themselves be embedded from external media player software such as existing apps on a mobile device, or may be built into an incentivized communications app 600 for comprehensive function in a single app). Information displayed in window 601 may be determined by clickable or otherwise interactive interface elements such as buttons for selecting whether to view such information as a recipient's inbox 611, profile information 612, payments or other incentive information 613, or settings 614.

As illustrated, when viewing an inbox a user may be presented with a variety of pending communications with associated information (such as message details 620 incentive details 621), as well as a plurality of clickable or otherwise interactive interface elements such as buttons for performing actions such as replying 622 to a message (which may optionally provide a variety of reply options such as saving a reply as a template or default for future use, setting a specific time or other criteria for sending, or other functionalities as previously described, referring to FIG. 4), choosing to waive the incentive 623 (such as may be desirable if, for example, a friend or family member sends a message from an account that has not been configured for free messaging), access message options 624 such as forwarding or folder organization (or any other appropriate message or inbox functionality as is common in the art), or to delete or archive 625 the message (or similar inbox functionality for removing a message from view to present another, as is common in the art). It should be appreciated that such interactive functions are exemplary and a variety of additional or alternate functions may be presented to a user.

According to the embodiment, when a user views a displayed message 601 a user may be automatically credited the associated incentive (such as, for example, when a user scrolls down to the bottom of a text message an incentive may be automatically applied). In this manner app behavior may be configured to prevent fraud or "spoofing" of message views to collect incentives, as interaction from the user is required—it may be appreciated that according to the previous example, a user might simply select messages and quickly scroll through them without reading, it should be appreciated that additional or alternate security and verification features or processes may be utilized according to the invention and such a simple means is described only by way of example and to illustrate basic function.

Providing an option 623 to accept a message and waive any incentive (thereby costing the sender nothing to send the communication) may be desirable such as to allow a user to accept messages from select parties (such as friends or family) without charging them, regardless of any previous configuration (as described above, referring to FIG. 5). Additionally, such functionality may be extended to allow a recipient additional actions pertaining to an incentive or communication, such as to "discount" a message and accept only a portion of the offered incentive, which might return the remainder to the sender.

It should be appreciated that the elements and behaviors illustrated for a mobile app 600 are exemplary and may vary widely according to the invention, and that additional or alternate elements or arrangements may be utilized according to the invention (such as, for example, enabling text-based or other searching of message to locate or retrieve specific messages based on a query, without adhering to a queue or other imposed organization or order). Furthermore, it should be appreciated that the nature of such an app as described may be readily adapted for use on a variety of platforms and is not limited to any particular physical device or software environment.

The skilled person will be aware of a range of possible modifications of the various embodiments described above. Accordingly, the present invention is defined by the claims and their equivalents.

What is claimed is:

1. A method for ordering electronic communications for a plurality of user devices based on incentives, the method comprising the steps of:
   receiving a plurality of connections from a plurality of user devices;
   receiving a plurality of incentives from one or more sender devices, each incentive of the plurality of incentives associated to one or more electronic communications of a plurality of electronic communications;
   receiving, from one or more sender devices, a plurality of incentives, each incentive of the plurality of incentives associated to the one or more electronic communication
   creating a message queue based on a hierarchical order of the at least portion of the plurality of electronic communications, the hierarchical order based one or more incentives associated to the one or more electronic communications;
   associating metadata with each electronic communication of the least a portion of the plurality of electronic communications, the metadata comprising, at least, an embedded interactive element;
   presenting a first electronic communication from the message queue, via a network connection, to a first user device, the electronic communication comprising at least a portion of the associated metadata;
   receiving a first level of engagement, of a plurality of levels of engagement, from the first user device, the first level of engagement associated to the first electronic communication;
   presenting a second electronic communication from the message queue, via a network connection, to the first user device, the electronic communication comprising at least a portion of the associated metadata;
   receiving a second level of engagement of the plurality of levels of engagement from the first user device, the second level of engagement associated to the second electronic communication;
   wherein the plurality levels of engagement each correspond to a time spent engaged or interaction, by the user device, with the embedded interactive element, or a combination thereof.

2. The method of claim 1, further comprising:
   (a) allowing users, via an auction service operating on the incentivization server, to compete for incentives to bundle with communications.

3. A system for ordering electronic communications for a plurality of user devices based on incentives, comprising:
   an incentivization server comprising at least a processor, a memory, and a plurality of programming instructions stored in the memory and operating on the processor, wherein the programming instructions, when operating on the processor, cause the processor to:

receive a plurality of connections from a plurality of user devices;

receive a plurality of incentives from one or more sender devices, each incentive of the plurality of incentives associated to one or more electronic communications of a plurality of electronic communications;

receive, from one or more sender devices, a plurality of incentives, each incentive of the plurality of incentives associated to the one or more electronic communication;

create a message queue based on a hierarchical order of the at least portion of the plurality of electronic communications, the hierarchical order based one or more incentives associated to the one or more electronic communications;

associate metadata with each electronic communication of the least a portion of the plurality of electronic communications, the metadata comprising, at least, an embedded interactive element;

present a first electronic communication from the message queue, via a network connection, to a first user device, the electronic communication comprising at least a portion of the associated metadata;

receive a first level of engagement, of a plurality of levels of engagement, from the first user device, the first level of engagement associated to the first electronic communication;

present a second electronic communication from the message queue, via a network connection, to the first user device, the electronic communication comprising at least a portion of the associated metadata;

receive a second level of engagement of the plurality of levels of engagement from the first user device, the second level of engagement associated to the second electronic communication;

wherein the plurality levels of engagement each correspond to a time spent engaged or interaction, by the user device, with the embedded interactive element, or a combination thereof.

4. The system of claim 3, further comprising a database; wherein the database stores incentive information.

5. The system of claim 4, wherein the database stores auction information.

6. The system of claim 5, wherein the database stores communication information.

* * * * *